US006563116B1

(12) United States Patent
Nikitin

(10) Patent No.: US 6,563,116 B1
(45) Date of Patent: May 13, 2003

(54) METHOD OF MEASURING SIZES OF TRAPEZOIDAL STRUCTURE

(75) Inventor: Arkady Nikitin, Moscow (RU)

(73) Assignee: General Miosphorix LLC, Ardsley, NY (US)

( * ) Notice: Subject to any disclaimer, the term of this patent is extended or adjusted under 35 U.S.C. 154(b) by 265 days.

(21) Appl. No.: 09/695,928

(22) Filed: Oct. 26, 2000

(51) Int. Cl.[7] .......................... G01N 23/00; G21K 7/00
(52) U.S. Cl. ...................................................... 250/311
(58) Field of Search ................................. 250/311, 306

(56) References Cited

U.S. PATENT DOCUMENTS 4,767,926 A * 8/1988 Murakoshi et al. ......... 250/310
5,750,990 A * 5/1998 Mizuno et al. ............. 250/307

FOREIGN PATENT DOCUMENTS

RU           2134864       * 8/1999

* cited by examiner

Primary Examiner—John R. Lee
Assistant Examiner—James Leybourne
(74) Attorney, Agent, or Firm—I. Zborovsky

(57) ABSTRACT

A method of measuring of sizes of trapezoidal objects along their lower base includes positioning an object to be measured in a scanning electron microscope so that a line of scanning of an object by an electronic beam corresponds with a direction along which a measurement is performed, selecting a magnification of the microscope so that an image of the object to be measured occupies a substantial part of a length of a scanning line, scanning a video signal of the object in accordance with coordinates along the scanning line, analyzing a shape of the video signal to determine whether the object to be measured has a smaller base facing upwardly a or downwardly, determining a location of stepped slopes on edge maxima of the video signal, and on each stepped slope-a reference point as a point on a lower step of the stepped slope where an absolute value of a derivative of the video signal has a maximum value, fixing of abcissa of the reference points in pixels, and calculating a size of the trapezoidal object along its lower base in pixels as the difference of the abcissa of reference points at two edge maxima.

8 Claims, 12 Drawing Sheets

1 - the Reference Point; 2 - the First Border Point;
3, 4 - the Second Border points; 5 - the Working Area.

*Trapezoidal projection: a) geometry, b) sample function.
c) video signal.*

*Groove of trapezoidal cross-section: a) geometry, b) sample function, c) video signal.*

*Geometry (a) and the Sample Function (b) for a Step with Vertical Sidewall.*

Step with inclined sidewall: a) geometry, b) sample function.

*a) Probe Position Plot under Digital Scanning Mode.*
*b) Line-to-Line Scanning of The Microscope Field of View.*
*1 – Microscope Field of View; 2 – Pixels.*

*Array and Sub-Array*

1 - the Reference Point; 2 - the First Border Point;
3, 4 - the Second Border points; 5 - the Working Area.

Trapezoidal projection:
a) – geometry; b) – video signal; c) – derivative of video signal.
L – size along lower edge.

Trapezoidal groove:
a) – geometry; b) – video signal; c) – derivative of video signal.
L – size along lower edge.

Edge maximum.

1 - is the Initial Video-signal; 2 - is the Convolution; D - is the Intersection Point.

*Auxiliary functions: a) Gauss function;
b) Heavyside function.*

METHOD OF MEASURING SIZES OF TRAPEZOIDAL STRUCTURE

BACKGROUND OF THE INVENTION

The present invention relates to measurements of small linear sizes and can be used in manufacture of industrial products with parts of micron, submicron and nanometer sizes, such as integrated circuits, including in the process of their manufacture at the stage of forming photoresist masks.

Methods of measurements of sizes in micron, submicron and nanometer ranges based on scanning electron microscopes are known. The known methods have certain disadvantages which include a high sensitivity of the results of measurements to variations of modes of microscope operation, in particular to changes of accelerating voltage, current of electronic beam, changes of detector types, including parameters which are determined by an operator in accordance with a visual perception and therefore are poorly reproducible, such as accuracy of focusing, level of residual astigmatism, contrasting and brightness of image. Also, the measurements have usually substantial errors determined by nature and properties of the sample and accuracy of its positioning and orientation in the microscope, as well as a dependency of the measurement results from inevitable non linear distortions of the video signal during its magnification in the microscope.

Since there is no accepted theory of image forming in the scanning electron microscope, these errors can not be predicted and prevented. Therefore the resulting error of measurements can reach a few tenths of micron or a few ten of percentage during measurements of submicron features.

A method of measurement of small sizes in a scanning electron microscope in accordance with so-called invariant points is disclosed for example in an article "Method of Precision Measurements of Submicron and Nanometric Objects in Scanning Electron Microscope", Ammosov et al, Magazine "Electronic Industry", 1997, no. 7–8, pp 163–168 (in Russian). This method is theoretically justified and eliminates some above mentioned disadvantages. It includes superposition of two curves corresponding to video signals of the same object, but different by the nature of focusing. The point of intersection of the curves corresponds to the edges of the object to be measured, while a distance therebetween, taking into account the magnification of the microscope represents an object size. However, the method includes the use of two curves obtained in different modes of the device, whose accurate superposition is practically impossible.

Russian patent no. 2134864 discloses another method in which the measurements of small linear sizes in a scanning electron microscope are performed in accordance with the invariant points resulting from intersection of a video signal with a calculated curve. This method is the closest to the present invention; however it possess also some disadvantages. It is therefore believed to be advisable to provide a method of the above mentioned general type which is a further improvement of the existing methods.

SUMMARY OF THE INVENTION

Accordingly, it is an object of the present invention to provide a new and improved method of measuring sizes of trapezoidal structure.

In keeping with these objects and with others which will become apparent hereinafter, one feature of present invention resides, briefly stated, in a method of measuring sizes of a trapezoidal structure which includes positioning an object to be measured in a scanning electron microscope so that a line of scanning of an object by an electronic beam corresponds to a direction along which a measurement is performed, selecting a magnification of the microscope so that an image of the object to be measured occupies a substantial part of a length of a scanning line, scanning a video signal of the object in accordance with coordinates along the scanning line, analyzing a shape of the video signal to determine whether the object to be measured has a smaller base facing upwardly so that the object forms a trapezoidal projection or downwardly so that the object forms a trapezoidal groove, determining a location of stepped slopes on edge maxima of the video signal, determining on each stepped slope of each edge maximum a reference point as a point on a lower step of the stepped slope where an absolute value of a derivative of the video signal has a maximum value, and fixing of abcissa of the reference points in pixels, and calculating a size of the trapezoidal object along its lower base in pixels as the difference of the abcissa of reference points at two edge maxima.

When the method is performed in accordance with the present invention, it represents a further improvement of the existing methods and eliminates the disadvantages of these existing methods.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
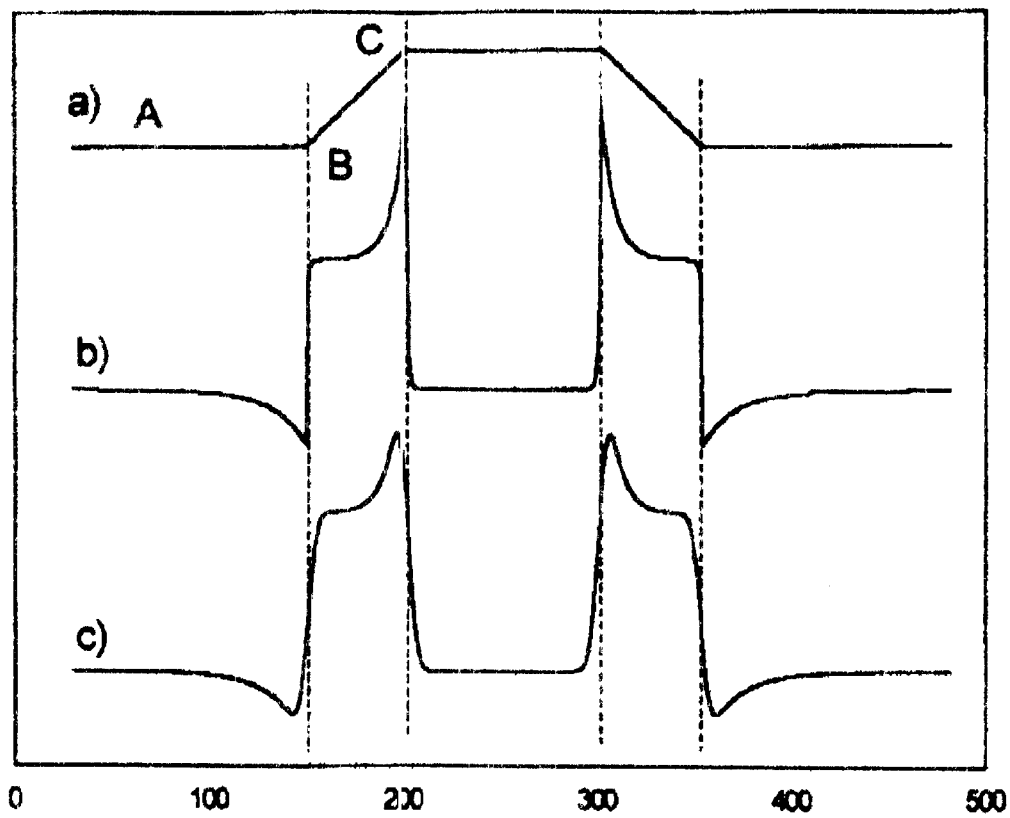
FIG. 1a is a view showing a geometry or a cross-section of a trapezoidal projection.
FIG. 1b is a view showing a function of a sample or object.
FIG. 1c shows a shape of a corresponding video signal, wherein coordinates are plotted on abcissa axis and along a line of scanning on a screen of scanning electron microscope or on a film in pixels, while values of a video signal S (u) are plotted along an ordinate axis, wherein edge maxima of the video signals with asymmetrical slopes are clearly visible.
Figure 2:
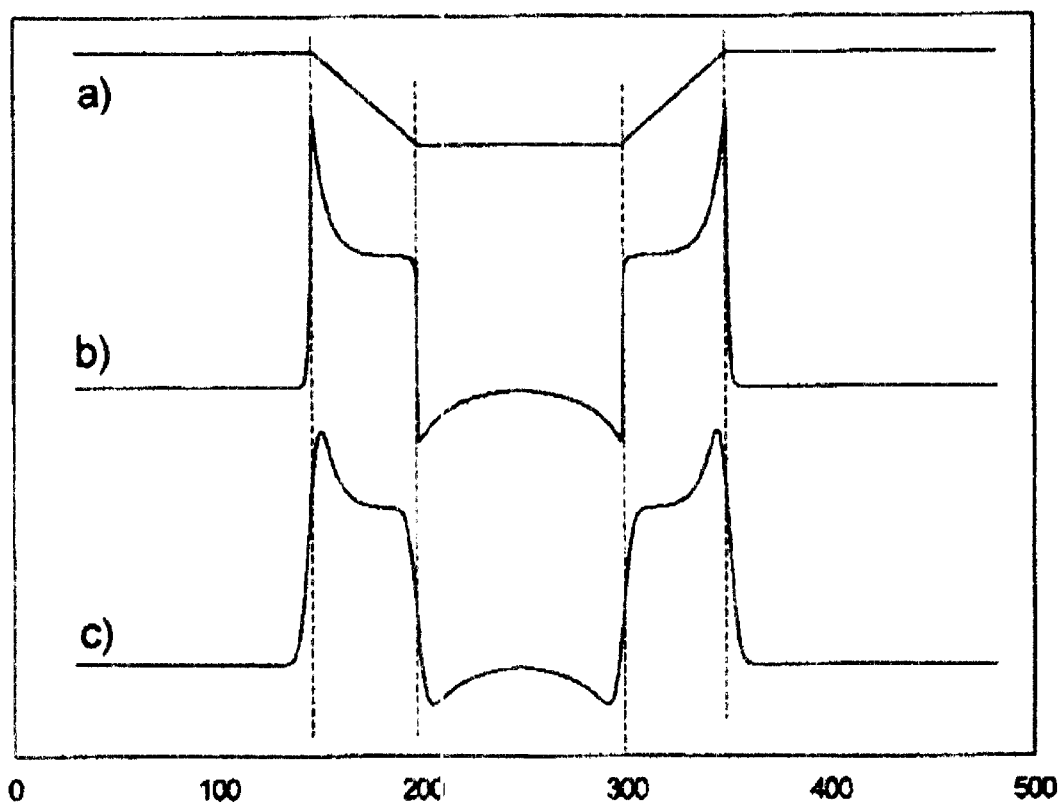
FIGS. 2a, 2b and 2c are views substantially corresponding to the views of FIGS. 1a, 1b, 1c, but for a trapezoidal groove, instead of the trapezoidal projection.

Before a specific description of the method in accordance with the present invention, the nature of the video signal and the basic principle will be described herein below. A typical shape of the video signal which takes place during scanning of an object and has a projection with a trapezoidal cross-section (line a) is shown in FIG. 1. It is produced by a beam of low-volt age primary electrons in condition of registration of slow secondary electrons in correspondence with the curve c, while the shape of the video signal for the object which contains a groove with the trapezoidal cross-section (line a) is shown in FIG. 2 in the same conditions of scanning as a curve c on FIG. 2. The specific feature of such video signals is that, in both cases near edges of the objects to be measured, there are maxima of video signals, or in other words "edge maxima" and slopes of these maxima are non symmetrical. One of the slopes is a monotonously descending, while the other slope has a pronounced stepped shape. The method of measurement in accordance with the present invention is based on the above mentioned shape of the video signals.

The execution of the method is provided since the video signal S is a function of the coordinate u along the line of scanning and is a result of convolution of two functions:

1. function of the object K (u') and
2. function of the beam $f_B$.

The function of the object is a pointed response of the object to its excitement by the electron beam of a single intensity, impinging a point with the coordinate u'. The function of the beam $f_B$ is a distribution of current density over a cross-section of the primary electron beam. In correspondence with the results of theoretical and experimental research, for a well adjusted microscope, the function of the beam has a circular symmetry and is approximated well by the Gauss formula:

$$Y(x) = \exp[-(x^2/\delta^2)],$$

wherein $\delta$ is a Gauss radius of the beam, and X is a distance from its center.

Therefore, the formula for video signal is as follows:

$$S(u) \cong \int_{-\infty}^{\infty} K(u') \exp\left\{\omega\left[\frac{(u-u')^2}{\delta^2}\right]\right\} du'$$

It should be noted that with the reduction of the radius of the beam or probe ($\delta \to 0$) the function of the beam is transformed into to a known $\delta$-Dirac function, and its convolution with the function of the object forms a video signal corresponding to $K(u'):S(u)_{\delta=0}=K(u')$. This can be considered as definition of the a function of the sample.

Figure 3:
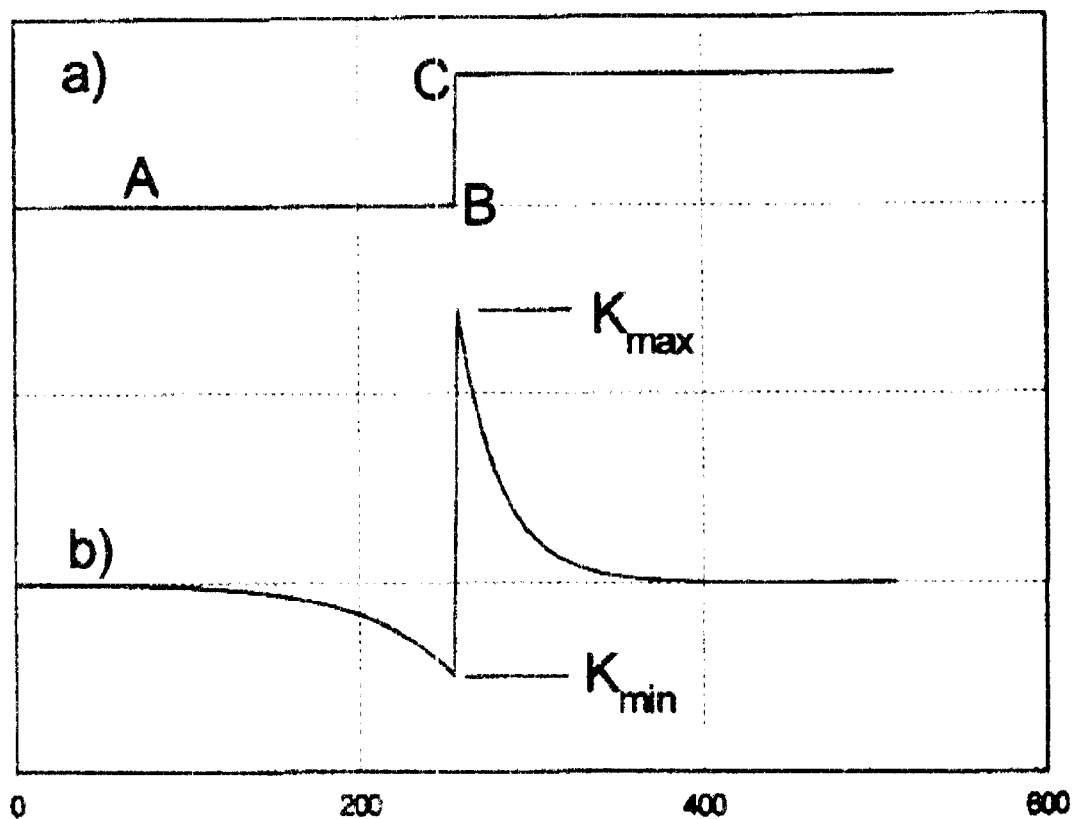
FIG. 3a is a view showing a geometry over a cross-section of a single rectangular step.
FIG. 3b is a view showing a shape of a function of the sample for the step of FIG. 3a, wherein on an abcissa axis, coordinates u' are plotted along a line of scanning on the sample in pixels, while on an ordinate axis values of function of the sample K(u') are plotted.

When the sample includes a step with a vertical side face corresponding to an extreme case of a trapezoidal structure of FIG. 3a is scanned with an infinitely narrow ($\delta \to 0$) beam of primary electrons, the function of the sample K(u') far from the edge of the projection in the area A will have a constant value $K_C$, since the conditions of generation and emission of secondary electrons from the sample will not change during the movement of the beam in this area.

When the point of impingement of the beam approaches at the left the edge of the step (B in FIG. 3a), the stream of secondary electrons and therefore the function of the samples K(u') will monotonously reduce due to the increasing screening of the stream by a side face. The worse condition of emission (and therefore the lowest value K(u')=$K_{min}$) is realized in the point B. To the contrary, the best conditions of emission of the stream of secondary electrons (and therefore the maximum value K(u')=$K_{max}$) is realized in the point C in FIG. 3a. Since the abscissas of the points B and C in this case coincide, the transition from the minimal value $K_{min}$ to its maximum value $K_{max}$ is performed by a jump, since the function of the sample in this point has an interruption as shown in FIG. 3b. During the subsequent movement of the point of impingement of the beam to the right from the point C, the function K(u') monotonously reduces to the value $K_O$ corresponding to the area A.

Figure 4:
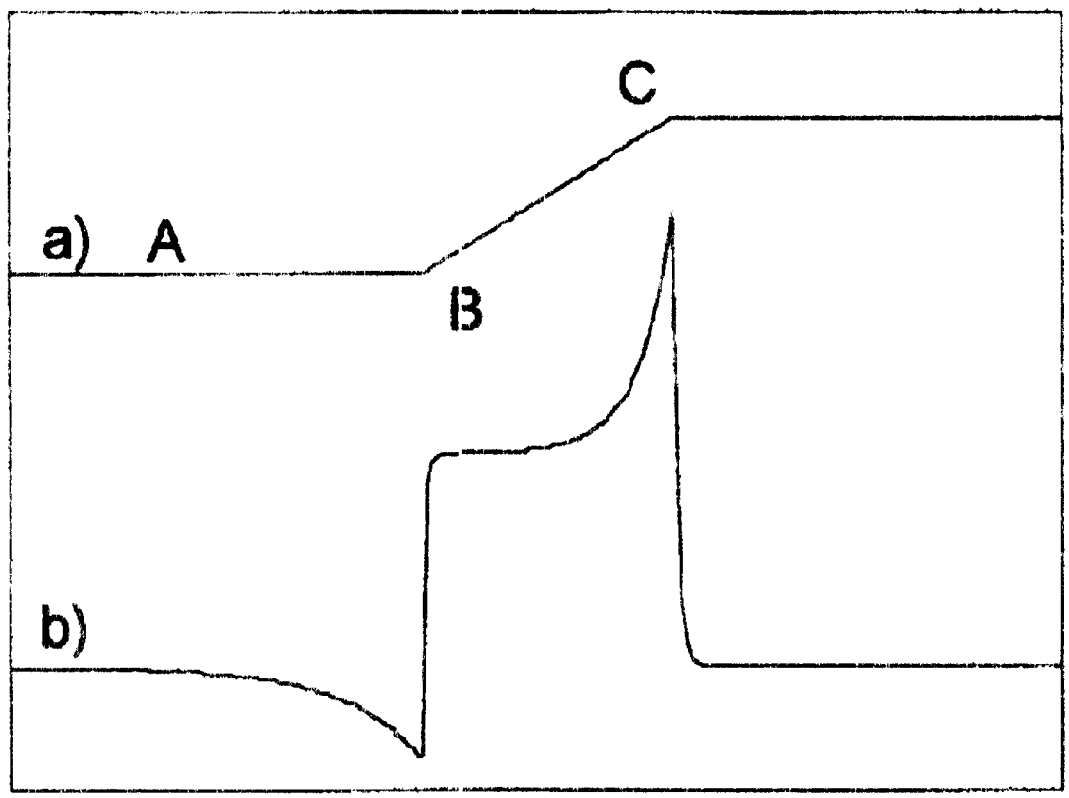
FIGS. 4a and 4b are views substantially corresponding to the views of FIGS. 3a and 3b but for a single inclined step.

Analogous processes and for the same reasons take place during scanning with the infinitely narrow beam of the sample which has a step with an inclined side face shown in FIG. 4a. As in the previous case the function of the sample K(u') in the area A is a constant value $K_O$ and reduces monotonously during approach to the point of impingement of the beam to the point B, where K(u') assumes its minimum value $K_{min}$. As in the previous case K(u') has an absolute maximum $K_{max}$ in the point C and then monotonously decreases to the level $K_O$. However, in this case the abcissas of the points B and C do not coincide and transition from minimal to maximal values K(u') which takes place in the area in the points B and C is performed along a complicated curve, whose shape is important for the present invention.

In order to make clear the mechanism of generation of the shape K(u') shown in FIG. 4b it should be mentioned that the area between the points B and C corresponds to the inclined side face of the object. The relationship of the coefficient of the second electronic emission $\eta$ from the angle $\alpha$ between the direction of the beam and a perpendicular to the inclined surface of the sample $\eta(\alpha)=\eta(0)/\cos \alpha$. In correspondence with this $K(\alpha)=K(0)/\cos \alpha$. Since the side face is flat, the angle $\alpha$ remains constant for the portion of the object between the points B and C. As a result, in this portion the function K(u') should have a constant value, a flat, at the level $K_{min}/\cos \alpha$.

This needs two additional clarifications. The transition from the minimal value K(u') in the point B to the plateau on the inclined portion is performed not by a jump. The exit to the plateau K(u') is performed on small distances from the beginning of the raise (point B) determined by the value t=5/[$\mu$*tg($\pi$/2-$\alpha$)], where $\mu$ is a linear coefficient of absorption of secondary electrons. Introduction of the typical values p and a in the last formula leads to the evaluations of t=0.15–0.25 nanometer.

The above mentioned flat K(u') does not extend up to the point C. As mentioned above, in this point the best conditions of emission of the secondary electrons from the object are realized, and therefore there is an absolute maximum K(u'). The raise of the function of sample from the level of flat to its maximum value $K_{max}$ takes place gradually during proximation of the point of impingement of the beam to the apex C. This condition forms more or less the right portion of the flat as shown schematically in FIG. 4b.

The above presented analysis explains the particularities of the shape K(u') shown in FIG. 4b. This analysis helps formulating criteria for localization of the point B on the diagram K(u'). This point has a unique feature: In particular in the vicinity of this point the function of the object (sample) increases sharply almost jump-like and its derivative has an interruption. The location of the point with these properties on the lower step of the stepped slope of FIG. 4b does not need serious algorithmic complication. If the error of order t/2 is disregarded, or in other words tenths of nanometer, then the lower level of the inclined step can be localized as a place where the almost jump-like transition of the function of the object takes place from its minimum value to the level of plateau.

In the real experiment the function of the sample K(u') never really is realized, but only the video signal which is a convolution of K(u') with the Gauss function of the beam. It is therefore desirable to analyze the shape of the video signal S(u) near the point B. The consideration of specific properties of the convolutions makes possible to conclude that with the use of sharply focused electron beams with a radius of a few nanometers (which is typical for the modern models of measuring scanning electron microscopes), the shape of the video signal S(u) will be analogous to the above considered shape of the function of the sample. In particular the edge splash (edge maximum) near the edge of the object to be measured will be maintained. The asymmetry of the slopes of this maximum will be maintained as well: One of the slopes will be a monotonously descending, while the other slope will have a stepped shape. However, there is no complete quantitative coincidence of the shape of the video signal and the function of the sample. On the lower step of the stepped slope there is only one point which is common for K(u') and S(u'), which is the point of their intersection. The location of this point practically (with an error of t/2) coincides with the lower border of the side face of the object or the point B in FIG. 4a.

It should be mentioned that the accepted algorithms of measurements always give the values of the sides which are slightly lower for the projections and slightly higher for the grooves. These errors of measurements are systematic, their reasons are presented herein below, and therefore they are easy to compensate by introduction of corresponding corrections.

Therefore for the inventive method it should be confirmed that the video signal in the point of its intersection with the function of the object is characterized by the following features:

1. Value of the video signal in this point is equal to an average between a maximum and a minimum value on a portion including the lower step of the stepped slope;
2. Absolute value of the derivative video signal S'(u) in this point will be maximum;
3. Superposition of the video signal and its convolution with the auxiliary even integrated function (for example Gauss function) leads a point of their intersection which corresponds to the point B in FIG. 11 and therefore practically coincide with the lower base of the trapezoidal object.

These features are used for localization of the borders of trapezoidal objects in accordance with their lower base and the measurements which are based on these concepts. The same is true for localization of the lower edge of the trapezoidal projection and measurements for measurements of algorithms for measurement of its width, as well as for the procedure of measurement of the groove of trapezoidal cross-section.

Figure 5:
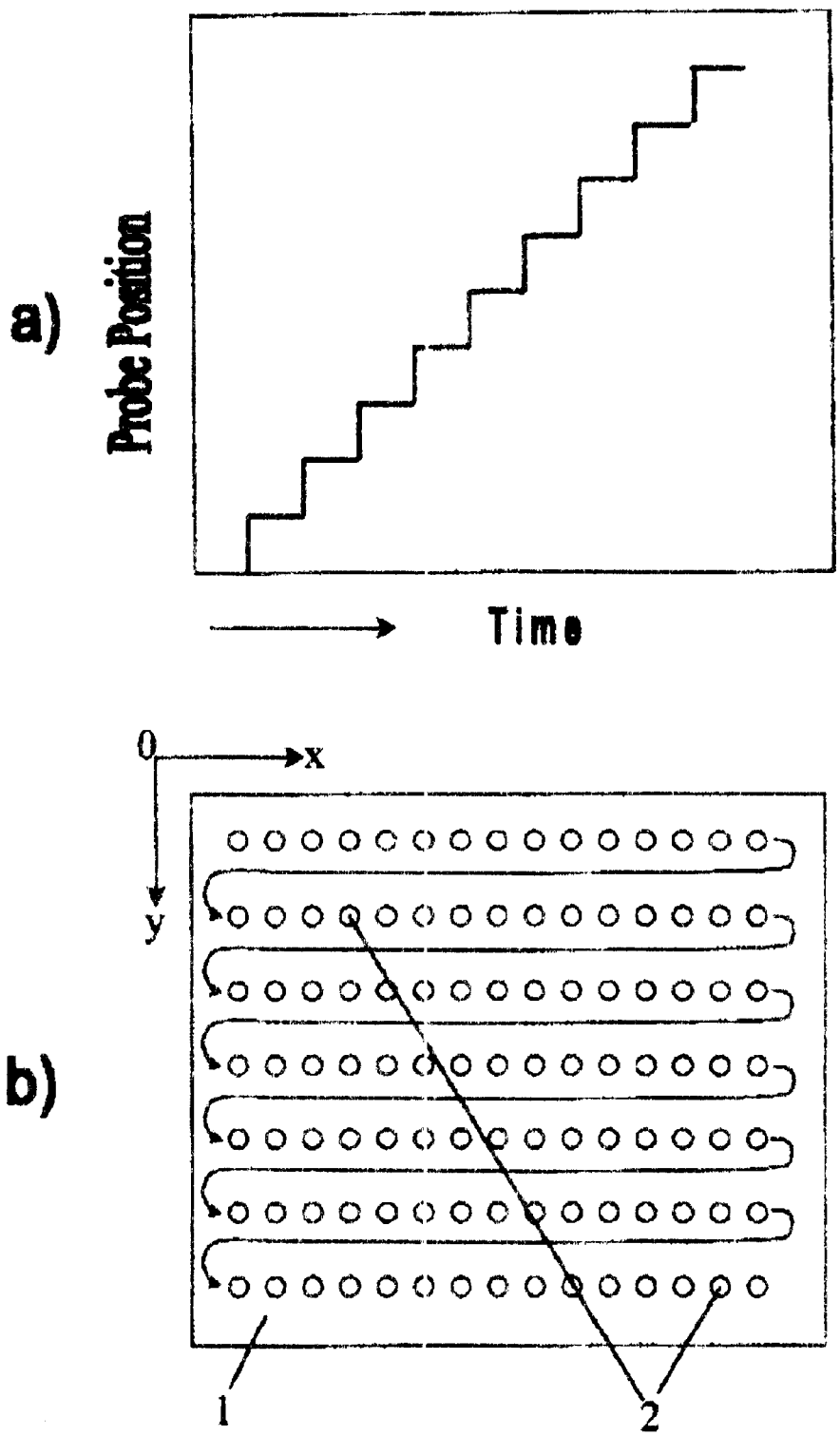
FIG. 5a is a diagram illustrating a principle of a digital scanning.
FIG. 5b is a view showing a sequence of reading of values of the video signal during digital scanning.

Turning now to specific features of the present invention, it has to be mentioned that for practical realization of measurements, corresponding algorithms are used in modern specialized devices for such measurements based on scanning electron microscopes. These measuring devices use digital scanning, providing quasi-stationary mode of reading of video signal. This scanning mode includes displacement of electron beam or probe to a given point of the surface of the object to be measured, and reading or scanning of the value of the video signal (or in other words a stream of secondary electrons, amplified in the video path of the microscope) with the immovable beam during a short time. Then the beam or probe is moved to a new position, is maintained in this position during the time of scanning of the video signal corresponding to the new position of the beam, and then the cycle of movement of the beam and measurement of the signal is repeated many times, until the beam which moves jump-like along the line of scanning reaches the edge of the image field of the microscope. A diagram of the movement of the beam, or in other words, dependence of is coordinate along the line of scanning from time, is shown in FIG. 5a. Then a transition to the new line and the movement of the beam is repeated in the same sequence as shown in FIG. 5b. During this scanning, the fixed (measured) video signal represents a set of its discrete values, corresponding to various points within the vision field of view of the microscope. For each point of the surface of the object with coordinates x and y inside the vision field, a concrete value of the measured video signal S (x, y) can be found. Such sets of discrete values are called two-dimensional digital arrays, and each position of the beam during the process of its jump-like movement is called pixel. Usually the number of pixels in the line of the scan, and a number of lines in the frame is a few hundreds or thousands. Frequently, the distribution of the scanning electron microscope image over 512×512 pixels is utilized.

The measurement of sizes with the electron microscope of this type starts from standard procedures, such as loading of an object to be measured into a chamber of the microscope, positioning a stage with the object, searching an element to be measured, selection of a magnification, focusing of the image, and thereafter a digital scanning of the object, with storing of the obtained two-dimensional digital array of values of the video signal for a subsequent processing. The processing of the input array of the data is explained herein below. A principle of line-by-line population of a line width is utilized and a subsequent averaging of the obtained values with calculation of an average value, dispersion (standard deviation) and presence of errors or blunders.

Figure 7:
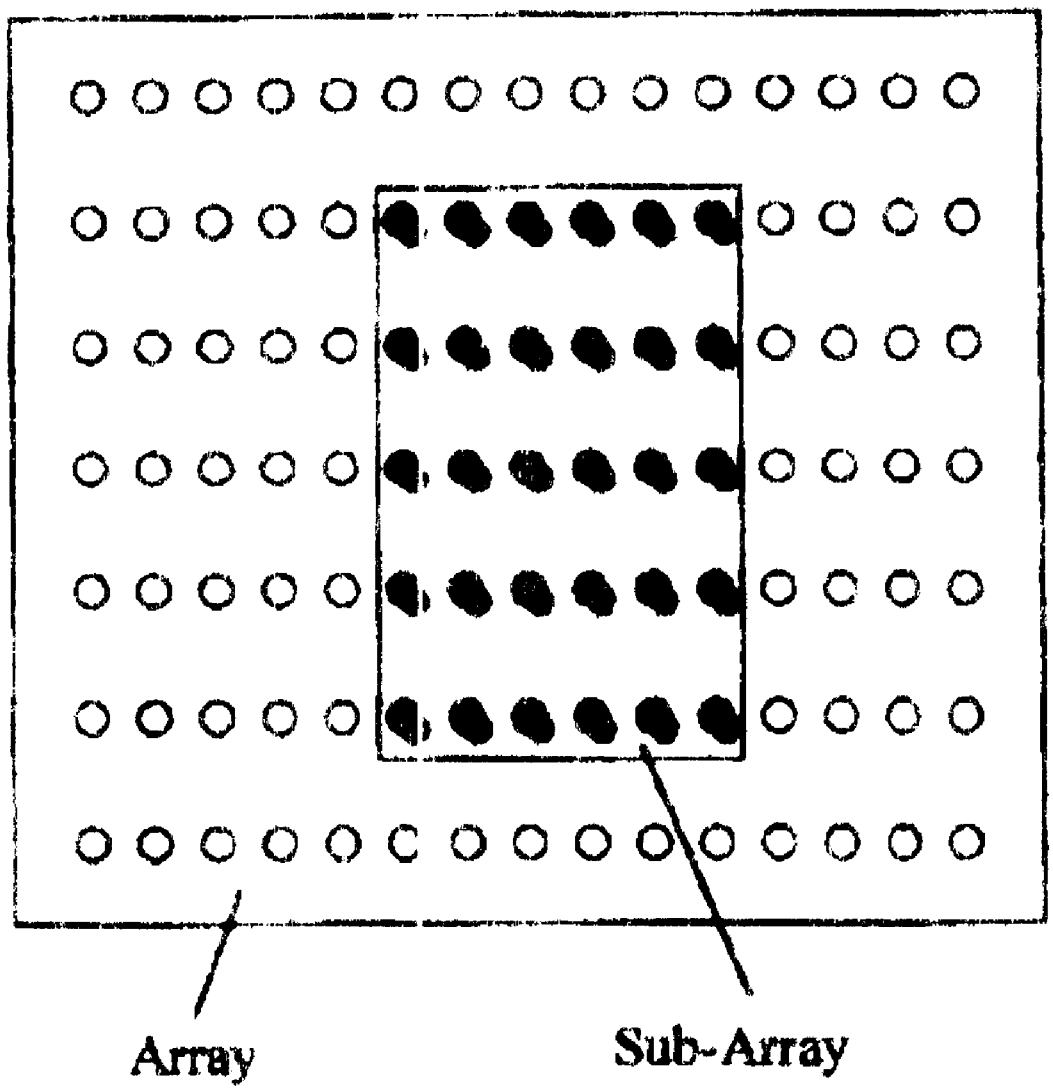
FIG. 7 is a view showing a procedure of separation of a working zone or a subarray.

The primary processing of a two-dimensional array of the values of the video signal includes separation of a so-called working fragment or sub array from the initial two-dimensional array shown in FIG. 7. This sub array must contain the image of the object to be measured, and it borders along the axis x and y are determined on the monitor of a computer by a program block. The borders of the fragment along the line of scanning must be symmetrical relative to the object to be measured, and the width of the fragment must be selected approximately twice the width of the object. The conformity with these conditions is controlled visually. All further procedures are performed within the limits of the thusly formed sub-array.

Figure 6:
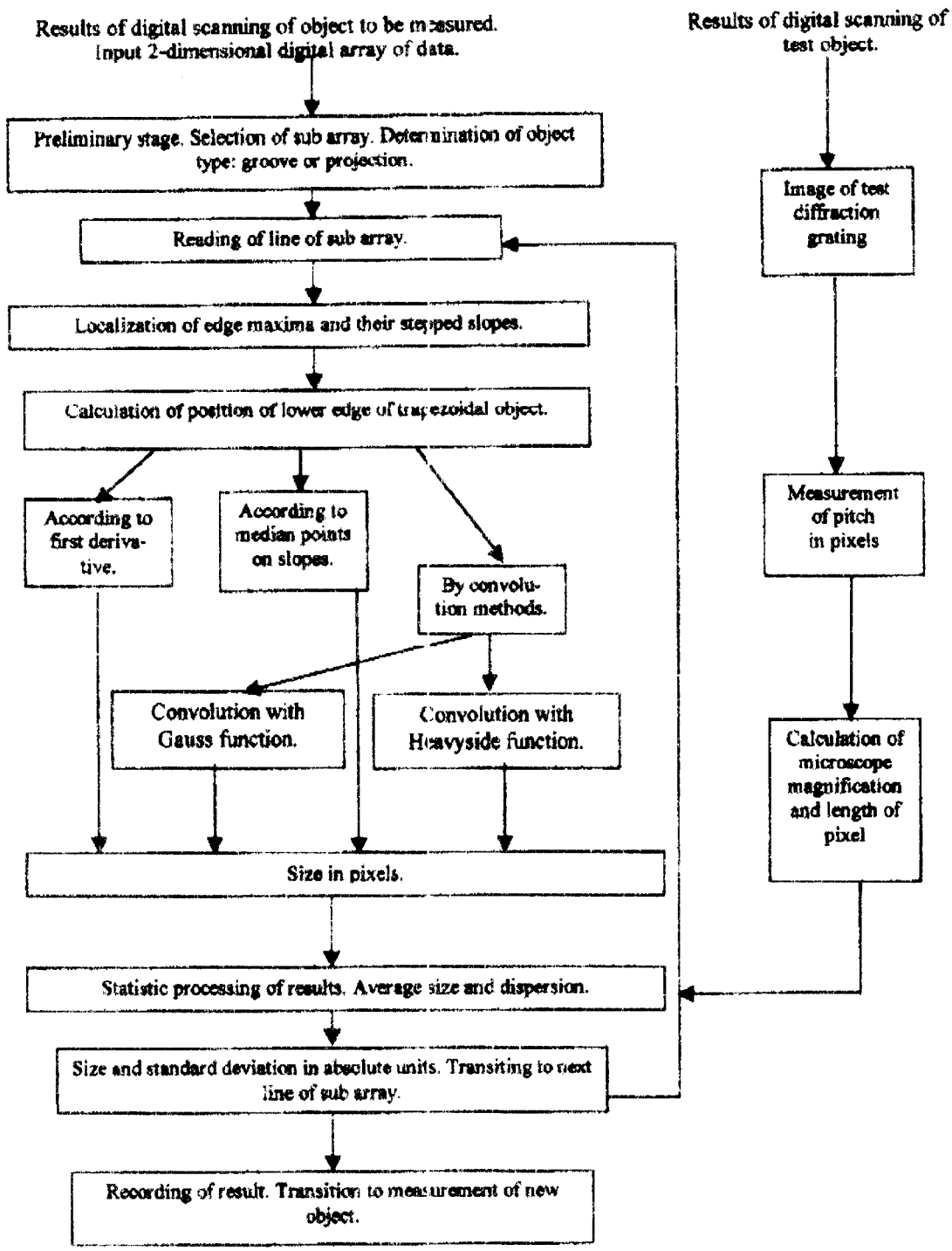
FIG. 6 is a view showing a block diagram of processing of digital arrays.

In accordance with the above, the measurement includes line-by-line processing of the two-dimensional sub array. First one line is read and actions are performed which are necessary for determination of the individual value of size of line width, and then the transition to processing of the next line is performed. This cycle is repeated until all lines of the frame are processed. At the end a statistic processing of the results is performed and their adaptation to an absolute scale of sizes. The general process of measurement of sizes in correspondence with the invention is shown in FIG. 6. The right branch of the diagram is outside of the present invention. Its introduction in the block diagram of FIG. 6 is carried out for providing a completeness and clarity of the explanation. In order to perform the operational measurement of the sizes, it is necessary to know a length of a pixel. Its value is determined by many known methods, for example in a process in accordance with our invention disclosed in U.S. patent application Ser. No. 09/346,902.

The procedure of processing of each line is presented herein below. The first step of the process is an analysis of the shape of the video signal for determination of a type of a signal, or in other words whether the object has a trapezoidal projection or a trapezoidal groove in the cross-section. The analysis is performed line-by-line. Each line is processed in the following way. The sub array is subdivided into the left and right parts along the separation line, extending approximately in the middle of the sub array so that the left and right half have one edge maximum. Maximal $S(x_L^{max})$, $S(x_R^{max})$ and minimal $S(x_L^{min})$, $S(x_R^{min})$ values of the signal are determined at the left and right edge maximum separately. Here $X_L^{max}$, $X_R^{max}$, $X_L^{min}$ and $X_R^{min}$ are coordinates of the points with maximum and minimum values of signal in the left and right parts of the sub array. The conclusion of the type of the object is performed by comparison of the two differences:

If $X_R^{min} - X_L^{min} > X_R^{max} - X_L^{max}$, then the object to be measured is a projection;

if $X_R^{min} - X_L^{min} < X_R^{max} - X_L^{max}$, the object is a groove with a trapezoidal cross-section.

Based on this conclusion, the position of stepped slopes of the edge maxima are determined. In accordance with the concept, for the projection the slopes are the exterior slopes of the edge maxima, and for the groove the slopes are the interior slopes of the edge maxima as shown in FIGS. 1 and 2.

Figure 8:
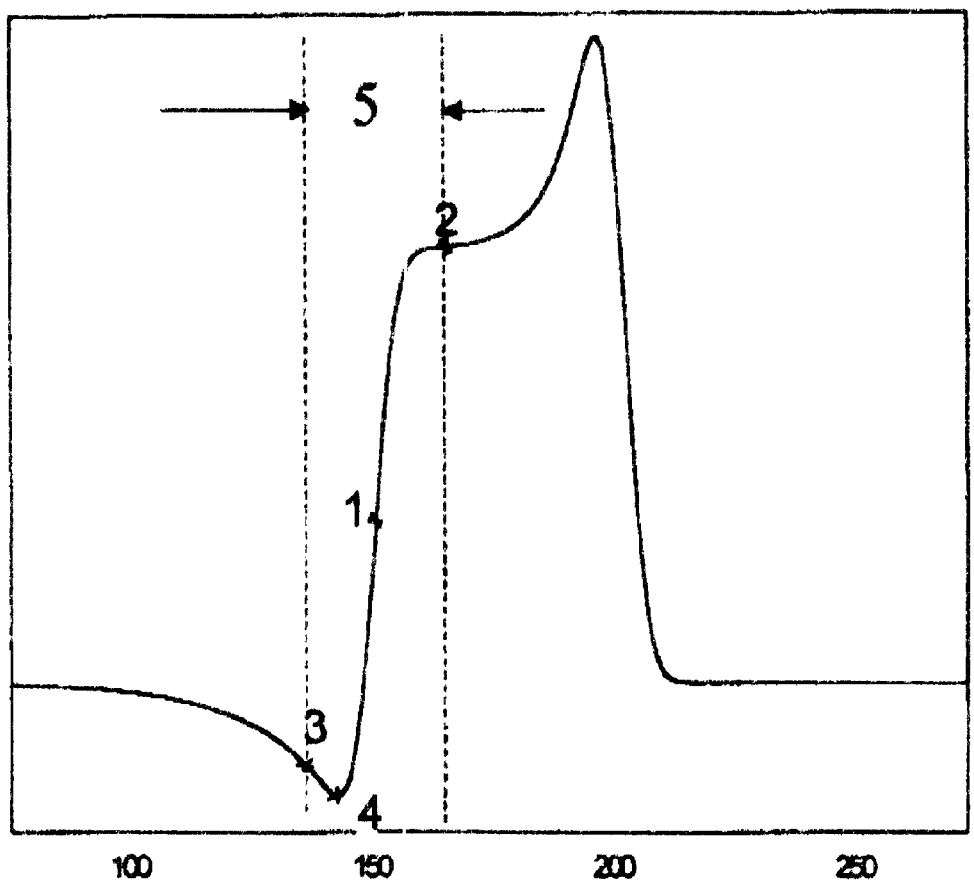
FIG. 8 is a view showing three important point on a stepped slope, namely one reference point and two border points.
Figure 9:
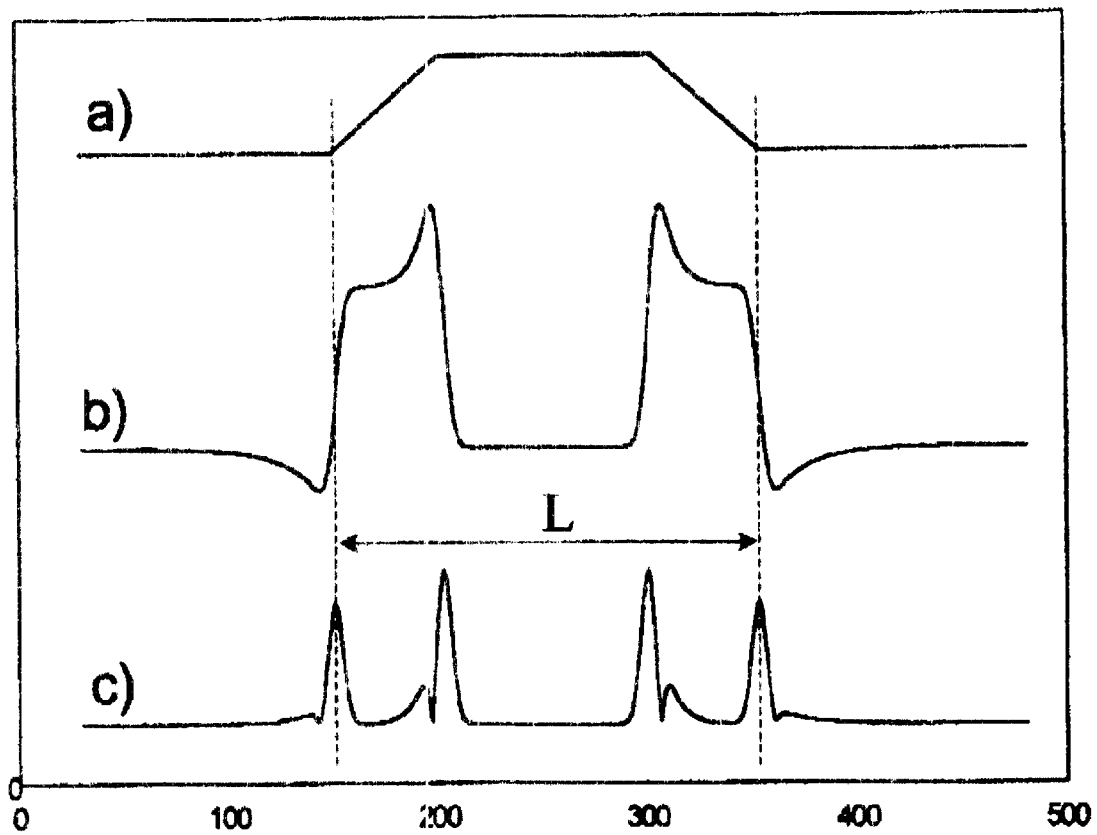
FIG. 9 is a view showing results of differentiation of the video signal wherein a) is a geometry of the projection, b) is a video signal; c) is an absolute value or module of the derivative.
Figure 10:
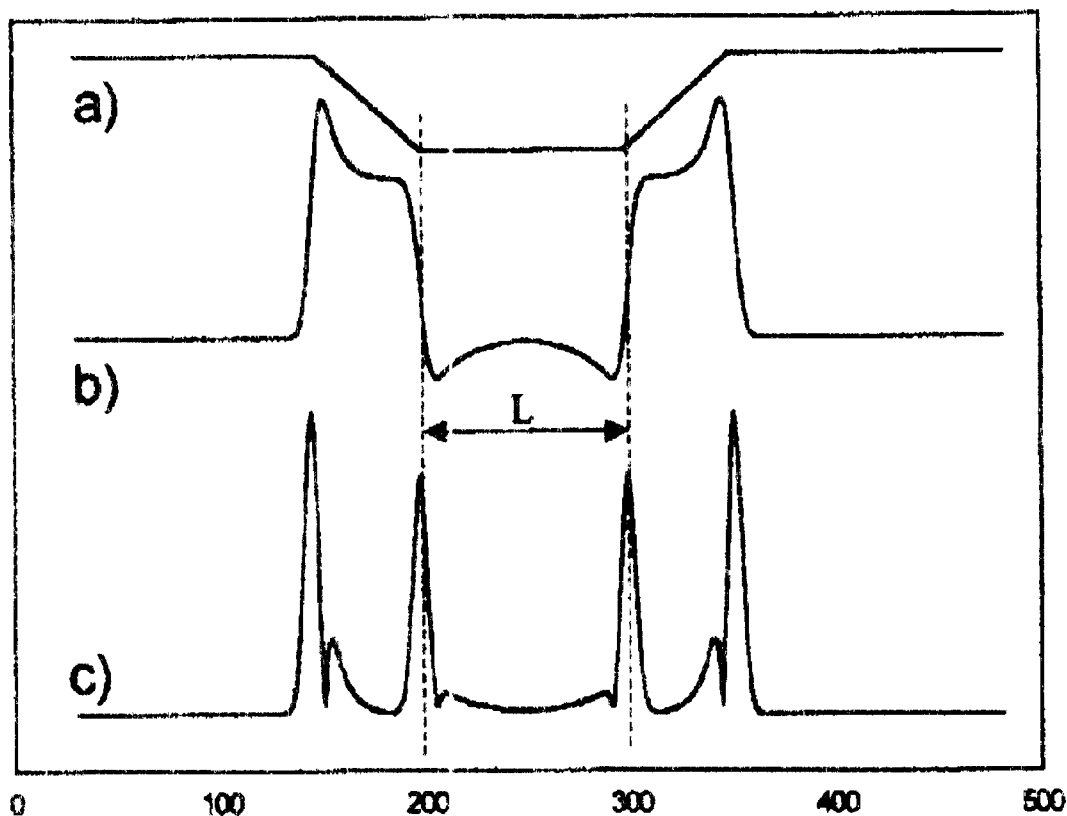
FIG. 10 is a view substantially corresponding to the view of FIG. 9, but for a groove instead of the projection.

Then a differentiation of the signal in accordance with the coordinates along the line of scanning is performed as shown in FIGS. 9 and 10. As a coordinate corresponding to the position of the lower edge of the trapezoidal object, the coordinate of the left reference point shown in FIG. 8 is taken, or in other words first point starting from left to right, of the exterior maximum of derivative over an absolute value at the left edge maxima (curve c), in FIG. 9. The coordinate of the right reference point corresponds to the position of the last (also exterior) maximum of the derivative in accordance with the absolute value at the right edge maximum. The size of the trapezoidal object in pixels is a difference of X coordinate of the right and left reference points.

During measurements of the trapezoidal grooves, analogous actions are performed with the sub array and the lines, with the difference that the step slopes of the edge maxima are located in this case at both sides of the separation line, at a minimal distance from it and are therefore interior points as shown in FIG. 10. The procedure of differentiation of the video signal, localization of the reference points on the step slopes and determination of the size of the object in pixels is performed in the same way as for the objects having a trapezoidal projection.

The measurement of the size when the side faces are different is performed with the determination of the border of the area of the processing near the reference points. This procedure is performed in the following manner. Since every reference point is located on a slope of a curve describing the video signal as shown in FIG. 8, the displacement along this curve in direction of increase of the video signal is performed from the position where the derivative of the video signal assumes a minimal value (has a minimum). The coordinate of this point is considered to be a first border point in FIG. 8. The position of the second border point is computed as a coordinate of a point located at an opposite side of the reference point and at a distance from the latter equal to the distance between the reference point and the first border point.

The second border point is located at the opposite side of the reference point and is characterized by a minimal value of the video signal as shown in FIG. 8. The area between the first and second border points, including the reference point, is considered to be the area of processing.

In the determined area of processing, a maximum and a minimum value of the video signal is determined, and the point where the video signal has a value equal half-sum of its minimum and maximum values is considered as a lower edge of the trapezoidal object (reference point) on each edge maximum of the video signal.

For selection of the areas of processing at the left and right edge maxima, it is necessary to calculate and modify video signal which is a convolution of the initial video signal with the auxiliary even integrating function, in accordance with the formula $$S^0(u) \cong C \int_{-\infty}^{\infty} S(u) = f(u-z) dz,$$

wherein $S^0(u)$ is a modified video signal, C is a standardizing factor, $S(u)$ is a function approximating the video signal in the processing area, $f(u-z)$ is an auxiliary even integrating function.

Figure 11:
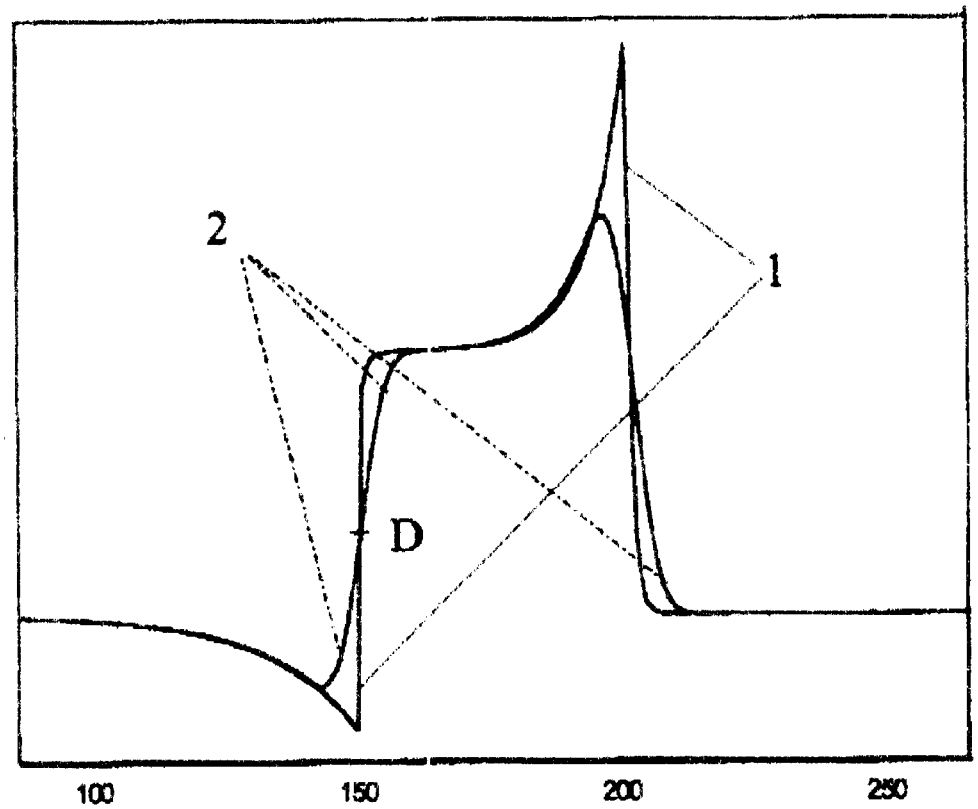
FIG. 11 is a view showing formation of an intersection between an initial video signal and a modified video signal, with the point D which is a reference point and corresponds to a lower edge of a trapezoidal object.
Figure 12:
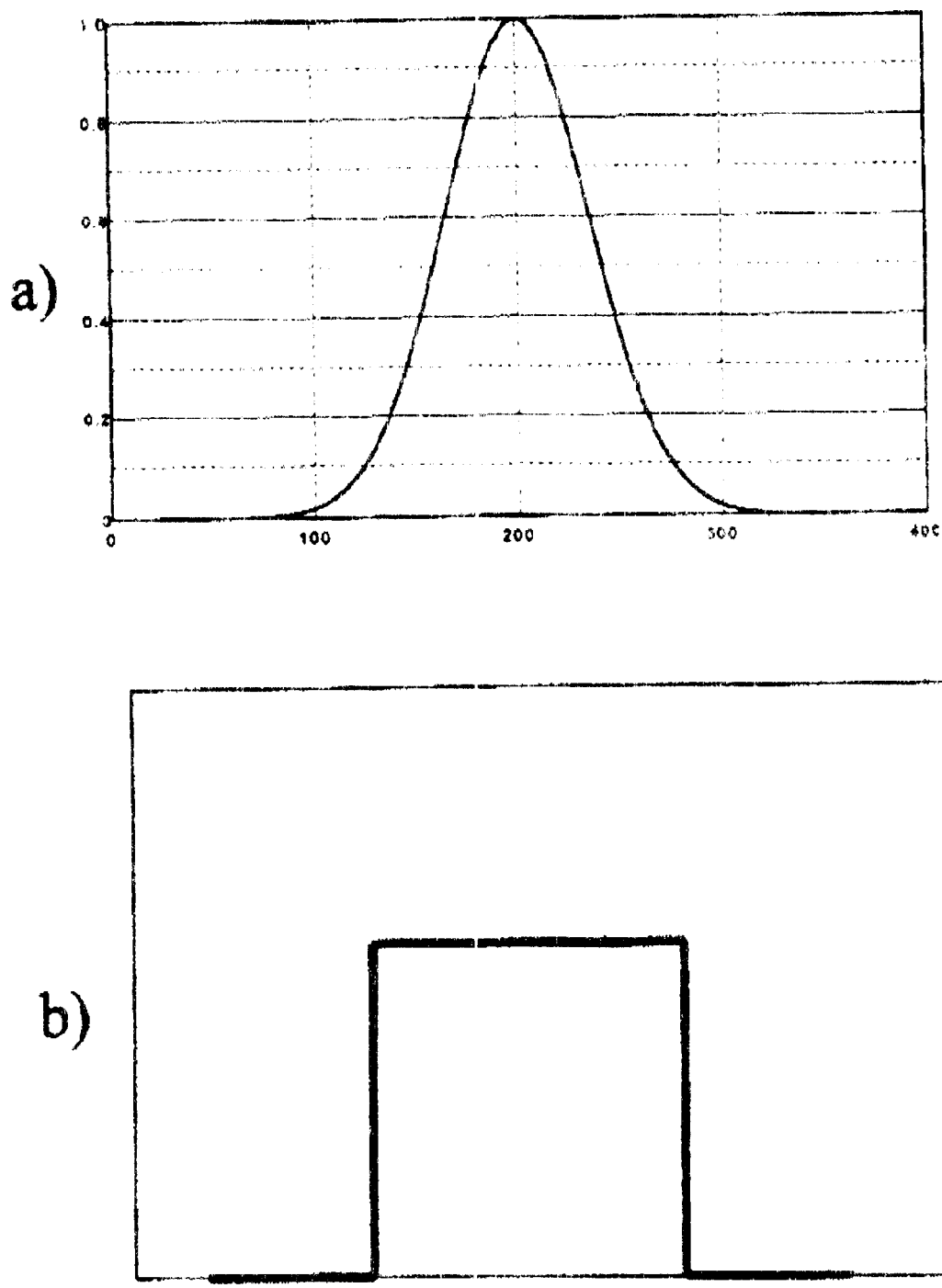
FIGS. 12a and 12b are examples of Gauss function and Heavyside auxiliary function.

The diagram of the modified video signal calculated this way is superposed on the diagram of the initial video signal, and within areas of processing, points of their intersection are determined, each point on each edge maximum as shown in FIG. 11. The distance along the axis between the points of intersection is considered as a size of the trapezoidal object along the lower base in pixels. FIG. 12 shows diagrams of two auxiliary even integrating functions, in particular in FIGS. 12a and 12b.

The auxiliary function can be the function $Y=A\{\exp[=(X^2/\delta^2]\}$, wherein A and $\delta$ are constant. Also, the auxiliary function can be a stepped function which is a derivative of single functions of Heavyside which are shifted and oriented in an opposite direction, such as $Y=u(A+t)^{2*}u(A-t)$, wherein U is a single function of Heavyside of argument t, A is a constant.

The individual values of the sizes along the direction of scanning correspond to the measurement along a separate line of the scan. The cycle of measurements is repeated a number of times in correspondence with the number of lines selected at the step of forming of the two-dimensional sub array. The results of the subsequent measurements are subjected to a standard statistic processing with calculation of an average value of the size and a standard deviation in pixels. At the last stage, the average values and standard deviations are adapted to an absolute scale of sizes, by multiplying the size in pixels by a length of one pixel. The value of the length of the pixel which is needed for this operation is introduced from outside, and determined as a result of calibration of magnification of the scanning microscope. The above mentioned process can be easily carried out in an automatic mode by means of a computer provided with software corresponding to the above mentioned sequence.

The method in accordance with the present invention is illustrated by a practical example, presented herein below.

In order to perform the method, computer programs with the above mentioned measurement algorithms have been created, with the programming language Turbo-Pascal for Windows. A scanning electron microscope image of a trapezoidal photoresist object was introduced into the input of the program. The measurement were performed individually along each line of the frame, and the obtained values were processed as independent values of measurement, for calculation of an average size and an average-square deviation of an average size.

A synthesized frame obtained as a result of a mathematical modeling of formation of the video signal of the trapezoidal photoresist projection was selected as a scanning electron microscope image to be processed. The geometrical parameters of the projection used during modeling were: shape of cross-section-unilateral trapeze, height of the shape-one micrometer, slope of side faces-88°, width of trapeze along a lower base 336.6 nanometers. Parameters of scanning: accelerating voltage 1×V, Gauss diameter of the beam 5 nanometers, number of elements of scanning-480 lines with 512 pixels in each, magnification 50,000, ratio of signal-noise in the video signal-over 20. The synthesized frame of the electron scanning microscope was presented by Dr. M. Postek (NIST). A correspondence of the model image to the real image was determined by multiple thorough comparisons performed over last years in NIST.

The selection of the model image as an object of measurements was based on the consideration that only in this case the result of the measurements can be compared with the actual values, which are known without errors. Based on this, it was possible to determine both an accidental error of the method (precision) and a systematic and complete error of the measurement (accuracy).

During testing of the method, the above mentioned model image was processed by a computerized program in accordance with the process disclosed in the present application with the use of the first and second border points and a reference point. The computation of the average value $L_{ave}$ and an average square deviation of the average value $RMS_{AVE}$ was performed automatically without direct participation of the operator. The results are presented herein below.

| Measured Values | Actual Values |
| --- | --- |
| $L_{ave}$ = 335.7 nanometers $RMS_{AVE}$ = +/−0.3 nanometer (1 sigma) | 336.69 nanometer |

Coincidence of the calculated values with the actual values can be considered as satisfactory (the deviation is less than 1 nanometer) and a dissipation of the results around the average value is acceptable and corresponding to the requirements of the industry for the years 2006–2008.

In this case the measured average value of the size of the projection was a little less than the actual value which completely corresponds to the above presented reasons for such deviations.

It will be understood that each of the elements described above, or two or more together, may also find a useful application in other types of methods differing from the types described above.

While the invention has been illustrated and described as embodied in method of measuring sizes of trapezoidal structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A method of measuring sizes of trapezoidal objects along their lower base, comprising the steps of positioning an object to be measured in a scanning electron microscope so that a line of scanning of an object by an electronic beam corresponds to a direction along which a measurement is performed; selecting a magnification of the microscope so that an image of the object to be measured occupies a substantial part of a length of a scanning line; scanning a video signal of the object in accordance with coordinates along the scanning line; analyzing a shape of the video signal to determine whether the object to be measured has a smaller base facing upwardly so that the object forms a trapezoidal projection or downwardly so that the object forms a trapezoidal groove; determining a location of stepped slopes on edge maxima of the video signal; determining on each stepped slope of each edge maximum a reference point as a point on a lower step of the stepped slope where an absolute value of a derivative of the video signal has a maximum value, and fixing of abcissa of said reference points in pixels, and calculating a size of the trapezoidal object along its lower base in pixels as the difference of the abcissas of reference points at two edge maxima.

2. A method as defined in claim 1; and further comprising repeating the same steps along further lines, and statistically averaging of results so as to calculate average sizes and a standard deviation from the average sizes; and converting the average results in accordance with absolute scale of sizes by multiplying the average size and the standard deviation in pixels by a length of one pixel.

3. A method as defined in claim 1, wherein said determining on the step slope of each edge maximum of a reference point includes locating on the stepped slope of each edge maximum of a first border point which is closer to said reference point, in which an absolute value of a derivative of the video signal has a minimum while said first border point is located higher on the slope than the reference point, with fixing of an abcissa of the first border point; and determining a location on each edge maximum of the video signal of a second border point which is located at an opposite side of said reference point at a distance along an axis of abcissa, which is equal to a difference of abcissas of said reference point and the first border point, and a portion of the video signal between the abcissa of the first and second border points being considered an area of processing of the video signal on each of the edge maxima; and within the area of processing finding a maximum $S_{max}$ and minimum $S_{min}$ values of the video signal, as well as a medium point where the video signal has an average value $S=(S_{max}+S_{min})/2$.

4. A method as defined in claim 1, wherein said calculation of the size of the trapezoidal object includes determining a distance between median points of said edge maxima to consider the distance as a size of the trapezoidal object in pixels.

5. A method as defined in claim 3, wherein the determining of a location of the second border point includes determining the second border point located at an opposite side of said reference point and having a minimal value of the video signal.

6. A method as defined in claim 3; and further comprising converting the video signal within the area of processing with an auxiliary even integratable function which is standardized by an integral of the function over infinite limits to form a converted video signal; superposing the video signal and its converting signal over one another to fix an abcissa of a point of their intersection separately for each edge maxima of the video signal, and determining a size of the trapezoidal object at the lower base in pixels as a difference between the points of the intersections at two edge maximums of the video signals.

7. A method as defined in claim 6; and further comprising using as the auxiliary function the function:

$$Y=A\{\exp[=(X^2/\delta^2)]\}$$

wherein A and $\delta$ are constant.

8. A method as defined in claim 6; and further comprising using as the auxiliary function a stepped function which is a product of shifted and oppositely oriented single Heavyside functions:

$$Y=u(A+t)^{2*}u(A-t),$$

wherein u is a single Heavyside function with argument t, and A is a constant.

* * * * *